(12) United States Patent
Quigley et al.

(10) Patent No.: US 8,678,041 B2
(45) Date of Patent: *Mar. 25, 2014

(54) FIBER REINFORCED SPOOLABLE PIPE

(75) Inventors: Peter A. Quigley, Duxbury, MA (US);
Michael Feechan, Katy, TX (US);
Thomas W. Wideman, Milton, MA (US)

(73) Assignee: Fiberspar Corporation, New Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/183,292

(22) Filed: Jul. 14, 2011

(65) Prior Publication Data

US 2012/0118423 A1    May 17, 2012

Related U.S. Application Data

(63) Continuation of application No. 12/404,513, filed on Mar. 16, 2009, now Pat. No. 8,001,997, which is a continuation of application No. 11/010,827, filed on Dec. 13, 2004, now Pat. No. 7,523,765.

(60) Provisional application No. 60/548,638, filed on Feb. 27, 2004.

(51) Int. Cl.
*F16L 11/00* (2006.01)

(52) U.S. Cl.
USPC ........... 138/129; 138/130; 138/123; 138/125; 138/172; 138/137

(58) Field of Classification Search
USPC ......... 138/126, 124, 125; 156/175; 428/36.91
See application file for complete search history.

(56) References Cited

U.S. PATENT DOCUMENTS

| 87,993 | A | 3/1869 | Weston |
| 142,388 | A | 9/1873 | Goble |
| 396,176 | A | 1/1889 | Simpson |
| 418,906 | A | 1/1890 | Bosworth |

(Continued)

FOREIGN PATENT DOCUMENTS

| BE | 559688 | 8/1957 |
| CH | 461199 | 8/1968 |

(Continued)

OTHER PUBLICATIONS

Austigard et al. "Composites Subsea: Cost Effective Prodcuts; an Industry Challenge" Subsea 94 International Conference, the 1994 Report on Subsea Engineering: The Continuing Challenges.

(Continued)

*Primary Examiner* — Patrick F Brinson
(74) *Attorney, Agent, or Firm* — Goodwin Procter LLP

(57) ABSTRACT

A spoolable pipe is disclosed, the spoolable pipe having an internal pressure barrier formed about a longitudinal axis, and a reinforcing layer(s) enclosing the internal pressure barrier. In one embodiment, the reinforcing layer(s) can include fibers having at least a partial helical orientation about approximately thirty and about approximately seventy degrees relative to the longitudinal axis, and, the wall can include at least one external layer enclosing the reinforcing layer(s) and having a permeability at least ten times greater than the permeability of the internal pressure barrier. The reinforcing layer(s) can further include a coating. The pipe can also include an energy conductor(s) integrated with and/or located between the internal pressure barrier and/or the reinforcing layer(s).

15 Claims, 5 Drawing Sheets

(56) References Cited

U.S. PATENT DOCUMENTS

| | | | |
|---|---|---|---|
| 482,181 A | 9/1892 | Kellom |
| 646,887 A | 4/1900 | Stowe et al. |
| 749,633 A | 1/1904 | Seeley |
| 1,234,812 A | 7/1917 | Simmmons |
| 1,793,455 A | 2/1931 | Buchanan |
| 1,890,290 A | 12/1932 | Hargreaves |
| 1,930,285 A | 10/1933 | Robinson |
| 2,464,416 A | 3/1949 | Raybould |
| 2,467,520 A | 4/1949 | Brubaker |
| 2,481,001 A | 9/1949 | Burckle |
| 2,624,366 A | 1/1953 | Pugh |
| 2,648,720 A | 8/1953 | Alexander |
| 2,690,769 A | 10/1954 | Brown |
| 2,725,713 A | 12/1955 | Blanchard |
| 2,742,931 A | 4/1956 | De Ganahl |
| 2,750,569 A | 6/1956 | Moon |
| 2,810,424 A | 10/1957 | Swartswelter et al. |
| 2,969,812 A | 1/1961 | De Ganahl |
| 2,973,975 A | 3/1961 | Ramberg et al. |
| 2,991,093 A | 7/1961 | Guarnaschelli |
| 3,086,369 A | 4/1963 | Brown |
| 3,116,760 A | 1/1964 | Matthews |
| 3,170,137 A | 2/1965 | Brandt |
| 3,212,528 A | 10/1965 | Haas |
| 3,277,231 A | 10/1966 | Downey et al. |
| 3,306,637 A | 2/1967 | Press et al. |
| 3,334,663 A | 8/1967 | Peterson |
| 3,354,292 A | 11/1967 | Kahn |
| 3,379,220 A | 4/1968 | Kiuchi et al. |
| 3,383,223 A | 5/1968 | Rose |
| 3,390,704 A | 7/1968 | Woodell |
| 3,477,474 A | 11/1969 | Mesler |
| 3,507,412 A | 4/1970 | Carter |
| 3,522,413 A | 8/1970 | Chrow |
| 3,554,284 A | 1/1971 | Nystrom |
| 3,579,402 A | 5/1971 | Goldsworthy et al. |
| 3,589,135 A | 6/1971 | Ede et al. |
| 3,589,752 A | 6/1971 | Spencer et al. |
| 3,604,461 A | 9/1971 | Matthews |
| 3,606,396 A | 9/1971 | Prosdocimo et al. |
| 3,606,402 A | 9/1971 | Medney |
| 3,612,580 A * | 10/1971 | Jones ........................ 285/294.2 |
| 3,654,967 A | 4/1972 | Atwell et al. |
| 3,677,978 A | 7/1972 | Dowbenko et al. |
| 3,685,860 A | 8/1972 | Schmidt |
| 3,692,601 A | 9/1972 | Goldsworthy et al. |
| 3,696,332 A | 10/1972 | Dickson, Jr. et al. |
| 3,700,519 A | 10/1972 | Carter |
| 3,701,489 A | 10/1972 | Goldsworthy et al. |
| 3,728,187 A | 4/1973 | Martin |
| 3,730,229 A | 5/1973 | D'Onofrio |
| 3,734,421 A | 5/1973 | Karlson et al. |
| 3,738,637 A | 6/1973 | Goldsworthy et al. |
| 3,740,285 A | 6/1973 | Goldsworthy et al. |
| 3,744,016 A | 7/1973 | Davis |
| 3,769,127 A | 10/1973 | Goldsworthy et al. |
| 3,773,090 A | 11/1973 | Ghersa et al. |
| 3,776,805 A | 12/1973 | Hansen |
| 3,783,060 A | 1/1974 | Goldsworthy et al. |
| 3,790,438 A | 2/1974 | Lewis et al. |
| 3,814,138 A | 6/1974 | Courtot |
| 3,817,288 A | 6/1974 | Ball |
| 3,828,112 A | 8/1974 | Johansen et al. |
| 3,856,052 A | 12/1974 | Feucht |
| 3,858,616 A | 1/1975 | Thiery et al. |
| 3,860,040 A | 1/1975 | Sullivan |
| 3,860,742 A | 1/1975 | Medney |
| 3,866,633 A | 2/1975 | Taylor |
| 3,901,281 A | 8/1975 | Morrisey |
| 3,907,335 A | 9/1975 | Burge et al. |
| 3,913,624 A | 10/1975 | Ball |
| 3,932,559 A | 1/1976 | Cantor et al. |
| 3,933,180 A | 1/1976 | Carter |
| 3,956,051 A | 5/1976 | Carter |
| 3,957,410 A | 5/1976 | Goldsworthy et al. |
| 3,960,629 A | 6/1976 | Goldsworthy |
| 3,974,862 A | 8/1976 | Fuhrmann et al. |
| 3,980,325 A | 9/1976 | Robertson |
| RE29,112 E | 1/1977 | Carter |
| 4,001,442 A | 1/1977 | Stahlberger et al. |
| 4,007,070 A | 2/1977 | Busdiecker |
| 4,013,101 A | 3/1977 | Logan et al. |
| 4,032,177 A | 6/1977 | Anderson |
| 4,048,807 A | 9/1977 | Ellers et al. |
| 4,053,343 A | 10/1977 | Carter |
| 4,057,610 A | 11/1977 | Goettler et al. |
| 4,067,916 A | 1/1978 | Jaeger et al. |
| 4,095,865 A | 6/1978 | Denison et al. |
| 4,104,095 A * | 8/1978 | Shaw .............................. 156/83 |
| 4,108,701 A | 8/1978 | Stanley |
| 4,111,237 A * | 9/1978 | Mutzner et al. ............... 138/125 |
| 4,111,469 A | 9/1978 | Kavick |
| 4,114,393 A | 9/1978 | Engle, Jr. et al. |
| 4,119,122 A | 10/1978 | de Putter |
| 4,125,423 A | 11/1978 | Goldsworthy |
| 4,133,972 A | 1/1979 | Andersson et al. |
| 4,137,949 A | 2/1979 | Linko, III et al. |
| 4,139,025 A | 2/1979 | Carlstrom et al. |
| 4,148,963 A | 4/1979 | Bourrain et al. |
| 4,190,088 A | 2/1980 | Lalikos et al. |
| 4,200,126 A | 4/1980 | Fish |
| 4,220,381 A | 9/1980 | van der Graaf et al. |
| 4,226,446 A | 10/1980 | Burrington |
| 4,241,763 A | 12/1980 | Antal et al. |
| 4,248,062 A | 2/1981 | McLain et al. |
| 4,261,390 A | 4/1981 | Belofsky |
| 4,273,160 A * | 6/1981 | Lowles ......................... 138/124 |
| 4,303,263 A | 12/1981 | Legris |
| 4,303,457 A | 12/1981 | Johansen et al. |
| 4,306,591 A | 12/1981 | Arterburn |
| 4,307,756 A | 12/1981 | Voigt et al. |
| 4,308,999 A | 1/1982 | Carter |
| 4,330,017 A * | 5/1982 | Satoh et al. .................... 138/126 |
| 4,336,415 A | 6/1982 | Walling |
| 4,351,364 A | 9/1982 | Cocks et al. |
| 4,380,252 A | 4/1983 | Gray et al. |
| 4,385,644 A | 5/1983 | Kaempen |
| 4,402,346 A * | 9/1983 | Cheetham et al. ............. 138/129 |
| 4,421,806 A | 12/1983 | Marks et al. |
| 4,422,801 A | 12/1983 | Hale et al. |
| 4,434,816 A | 3/1984 | Di Giovanni et al. |
| 4,445,734 A | 5/1984 | Cunningham |
| 4,446,892 A | 5/1984 | Maxwell et al. |
| 4,447,378 A | 5/1984 | Gray et al. |
| 4,463,779 A | 8/1984 | Wink et al. |
| 4,469,729 A | 9/1984 | Watanabe et al. |
| 4,488,577 A | 12/1984 | Shilad et al. |
| 4,507,019 A | 3/1985 | Thompson |
| 4,515,737 A | 5/1985 | Karino et al. |
| 4,522,058 A | 6/1985 | Ewing |
| 4,522,235 A | 6/1985 | Kluss et al. |
| 4,530,379 A | 7/1985 | Policelli |
| 4,556,340 A | 12/1985 | Morton |
| 4,567,916 A | 2/1986 | Antal et al. |
| 4,578,675 A | 3/1986 | MacLeod |
| 4,606,378 A | 8/1986 | Meyer et al. |
| 4,627,472 A | 12/1986 | Goettler et al. |
| 4,652,475 A | 3/1987 | Haney et al. |
| 4,657,795 A | 4/1987 | Foret et al. |
| 4,681,169 A | 7/1987 | Brookbank, III |
| 4,700,751 A | 10/1987 | Fedrick |
| 4,712,813 A | 12/1987 | Passerell et al. |
| 4,728,224 A | 3/1988 | Salama et al. |
| 4,741,795 A | 5/1988 | Grace et al. |
| 4,758,455 A | 7/1988 | Campbell et al. |
| 4,789,007 A | 12/1988 | Cretel et al. |
| 4,842,024 A | 6/1989 | Palinchak |
| 4,844,516 A | 7/1989 | Baker |
| 4,849,668 A | 7/1989 | Crawley et al. |
| 4,854,349 A | 8/1989 | Foreman |
| 4,859,024 A | 8/1989 | Rahman |
| 4,869,293 A | 9/1989 | Botsolas |
| 4,903,735 A | 2/1990 | Delacour et al. |
| 4,913,657 A | 4/1990 | Naito et al. |

(56) References Cited

U.S. PATENT DOCUMENTS

| | | |
|---|---|---|
| 4,936,618 A | 6/1990 | Sampa et al. |
| 4,941,774 A | 7/1990 | Harmstorf et al. |
| 4,942,903 A | 7/1990 | Jacobsen et al. |
| 4,972,880 A | 11/1990 | Strand |
| 4,992,787 A | 2/1991 | Helm |
| 4,995,761 A | 2/1991 | Barton |
| 5,024,252 A | 6/1991 | Ochsner |
| 5,048,572 A | 9/1991 | Levine |
| 5,077,107 A | 12/1991 | Kaneda et al. |
| 5,090,741 A | 2/1992 | Yokomatsu et al. |
| 5,097,870 A | 3/1992 | Williams |
| 5,156,206 A | 10/1992 | Cox |
| 5,170,011 A | 12/1992 | Martucci |
| 5,172,765 A | 12/1992 | Sas-Jaworsky et al. |
| 5,176,180 A | 1/1993 | Williams et al. |
| 5,182,779 A | 1/1993 | D'Agostino et al. |
| 5,184,682 A | 2/1993 | Delacour et al. |
| 5,188,872 A | 2/1993 | Quigley |
| 5,209,136 A | 5/1993 | Williams |
| 5,222,769 A | 6/1993 | Kaempen |
| 5,261,462 A | 11/1993 | Wolfe et al. |
| 5,265,648 A | 11/1993 | Lyon |
| 5,285,008 A | 2/1994 | Sas-Jaworsky et al. |
| 5,285,204 A | 2/1994 | Sas-Jaworsky |
| 5,330,807 A | 7/1994 | Williams |
| 5,332,269 A | 7/1994 | Homm |
| 5,334,801 A | 8/1994 | Mohn et al. |
| 5,346,658 A | 9/1994 | Gargiulo |
| 5,348,088 A | 9/1994 | Laflin et al. |
| 5,348,096 A | 9/1994 | Williams |
| 5,351,752 A | 10/1994 | Wood et al. |
| RE34,780 E | 11/1994 | Trenconsky et al. |
| 5,364,130 A | 11/1994 | Thalmann |
| 5,373,870 A | 12/1994 | Derroire et al. |
| 5,394,488 A | 2/1995 | Fernald et al. |
| 5,395,913 A | 3/1995 | Bottcher et al. |
| 5,398,729 A | 3/1995 | Spurgat |
| 5,416,724 A | 5/1995 | Savic |
| 5,426,297 A | 6/1995 | Dunphy et al. |
| 5,428,706 A | 6/1995 | Lequeux et al. |
| 5,435,867 A | 7/1995 | Wolfe et al. |
| 5,437,311 A | 8/1995 | Reynolds |
| 5,437,899 A | 8/1995 | Quigley |
| 5,443,099 A | 8/1995 | Chaussepied et al. |
| 5,452,923 A | 9/1995 | Smith |
| 5,460,416 A | 10/1995 | Freidrich et al. |
| RE35,081 E | 11/1995 | Quigley |
| 5,469,916 A | 11/1995 | Sas-Jaworsky et al. |
| 5,472,764 A | 12/1995 | Kehr et al. |
| 5,494,374 A | 2/1996 | Youngs et al. |
| 5,499,661 A | 3/1996 | Odru et al. |
| 5,507,320 A * | 4/1996 | Plumley .................. 138/126 |
| 5,524,937 A | 6/1996 | Sides, III et al. |
| 5,525,698 A | 6/1996 | Bottcher et al. |
| 5,538,513 A | 7/1996 | Okajima et al. |
| 5,551,484 A | 9/1996 | Charboneau |
| 5,558,375 A | 9/1996 | Newman |
| 5,622,211 A | 4/1997 | Martin et al. |
| 5,641,956 A | 6/1997 | Vengsarkar et al. |
| 5,671,811 A | 9/1997 | Head et al. |
| 5,679,425 A * | 10/1997 | Plumley .................. 428/35.7 |
| 5,683,204 A | 11/1997 | Lawther et al. |
| 5,692,545 A | 12/1997 | Rodrigue |
| 5,718,956 A | 2/1998 | Gladfelter et al. |
| 5,730,188 A | 3/1998 | Kalman et al. |
| 5,755,266 A | 5/1998 | Aanonsen et al. |
| 5,758,990 A | 6/1998 | Davies et al. |
| 5,785,091 A | 7/1998 | Barker, II |
| 5,795,102 A | 8/1998 | Corbishley et al. |
| 5,797,702 A | 8/1998 | Drost et al. |
| 5,798,155 A | 8/1998 | Yanagawa et al. |
| 5,804,268 A | 9/1998 | Mukawa et al. |
| 5,826,623 A | 10/1998 | Akiyoshi et al. |
| 5,828,003 A | 10/1998 | Thomeer et al. |
| 5,865,216 A | 2/1999 | Youngs |
| 5,868,169 A * | 2/1999 | Catallo .................. 138/98 |
| 5,875,792 A | 3/1999 | Campbell, Jr. et al. |
| 5,908,049 A | 6/1999 | Williams et al. |
| 5,913,337 A | 6/1999 | Williams et al. |
| 5,913,357 A | 6/1999 | Hanazaki et al. |
| 5,921,285 A | 7/1999 | Quigley et al. |
| 5,933,945 A | 8/1999 | Thomeer et al. |
| 5,950,651 A | 9/1999 | Kenworthy et al. |
| 5,951,812 A | 9/1999 | Gilchrist, Jr. |
| 5,979,506 A | 11/1999 | Aarseth |
| 5,984,581 A | 11/1999 | McGill et al. |
| 5,988,702 A | 11/1999 | Sas-Jaworsky |
| 6,004,639 A | 12/1999 | Quigley et al. |
| 6,016,845 A | 1/2000 | Quigley et al. |
| 6,032,699 A | 3/2000 | Cochran et al. |
| 6,065,540 A | 5/2000 | Thomeer et al. |
| 6,066,377 A | 5/2000 | Tonyali et al. |
| 6,076,561 A | 6/2000 | Akedo et al. |
| 6,093,752 A | 7/2000 | Park et al. |
| 6,109,306 A | 8/2000 | Kleinert |
| 6,136,216 A | 10/2000 | Fidler et al. |
| 6,148,866 A | 11/2000 | Quigley et al. |
| 6,209,587 B1 | 4/2001 | Hsich et al. |
| 6,220,079 B1 | 4/2001 | Taylor et al. |
| 6,286,558 B1 | 9/2001 | Quigley et al. |
| 6,315,002 B1 | 11/2001 | Antal et al. |
| 6,328,075 B1 | 12/2001 | Furuta et al. |
| 6,334,466 B1 | 1/2002 | Jani et al. |
| 6,357,485 B2 | 3/2002 | Quigley et al. |
| 6,357,966 B1 | 3/2002 | Thompson et al. |
| 6,361,299 B1 | 3/2002 | Quigley et al. |
| 6,372,861 B1 | 4/2002 | Schillgalies et al. |
| 6,390,140 B2 | 5/2002 | Niki et al. |
| 6,402,430 B1 | 6/2002 | Guesnon et al. |
| 6,422,269 B1 | 7/2002 | Johansson et al. |
| 6,461,079 B1 | 10/2002 | Beaujean et al. |
| 6,470,915 B1 | 10/2002 | Enders et al. |
| 6,532,994 B1 | 3/2003 | Enders et al. |
| 6,557,485 B1 | 5/2003 | Sauter et al. |
| 6,604,550 B2 | 8/2003 | Quigley et al. |
| 6,620,475 B1 | 9/2003 | Reynolds, Jr. et al. |
| 6,631,743 B2 | 10/2003 | Enders et al. |
| 6,634,387 B1 | 10/2003 | Glejbøl et al. |
| 6,634,388 B1 | 10/2003 | Taylor et al. |
| 6,634,675 B2 | 10/2003 | Parkes |
| 6,663,453 B2 | 12/2003 | Quigley et al. |
| 6,706,348 B2 | 3/2004 | Quigley et al. |
| 6,706,398 B1 | 3/2004 | Revis |
| 6,746,737 B2 | 6/2004 | Debalme et al. |
| 6,764,365 B2 | 7/2004 | Quigley et al. |
| 6,773,774 B1 * | 8/2004 | Crook et al. .................. 428/34.7 |
| 6,787,207 B2 | 9/2004 | Lindstrom et al. |
| 6,803,082 B2 | 10/2004 | Nichols et al. |
| 6,807,988 B2 | 10/2004 | Powell et al. |
| 6,807,989 B2 | 10/2004 | Enders et al. |
| 6,857,452 B2 | 2/2005 | Quigley et al. |
| 6,889,716 B2 | 5/2005 | Lundberg et al. |
| 6,902,205 B2 | 6/2005 | Bouey et al. |
| 6,978,804 B2 | 12/2005 | Quigley et al. |
| 6,983,766 B2 | 1/2006 | Baron et al. |
| 7,021,339 B2 | 4/2006 | Hagiwara et al. |
| 7,029,356 B2 | 4/2006 | Quigley et al. |
| 7,080,667 B2 | 7/2006 | McIntyre et al. |
| 7,152,632 B2 | 12/2006 | Quigley et al. |
| 7,234,410 B2 | 6/2007 | Quigley et al. |
| 7,243,716 B2 | 7/2007 | Denniel et al. |
| 7,285,333 B2 | 10/2007 | Wideman et al. |
| 7,328,725 B2 | 2/2008 | Henry et al. |
| 7,498,509 B2 | 3/2009 | Brotzell et al. |
| 7,523,765 B2 * | 4/2009 | Quigley et al. .................. 138/129 |
| 7,600,537 B2 | 10/2009 | Bhatnagar et al. |
| 8,187,687 B2 * | 5/2012 | Wideman et al. .................. 428/36.3 |
| 2001/0006712 A1 | 7/2001 | Hibino et al. |
| 2001/0013669 A1 | 8/2001 | Cundiff et al. |
| 2001/0025664 A1 | 10/2001 | Quigley et al. |
| 2002/0081083 A1 | 6/2002 | Griffioen et al. |
| 2002/0094400 A1 | 7/2002 | Lindstrom et al. |
| 2002/0119271 A1 | 8/2002 | Quigley et al. |
| 2002/0185188 A1 | 12/2002 | Quigley et al. |

(56) References Cited

U.S. PATENT DOCUMENTS

| | | |
|---|---|---|
| 2003/0008577 A1 | 1/2003 | Quigley et al. |
| 2003/0087052 A1 | 5/2003 | Wideman et al. |
| 2004/0014440 A1 | 1/2004 | Makela et al. |
| 2004/0025951 A1 | 2/2004 | Baron et al. |
| 2004/0052997 A1 | 3/2004 | Santo |
| 2004/0074551 A1 | 4/2004 | McIntyre |
| 2004/0096614 A1 | 5/2004 | Quigley et al. |
| 2004/0265524 A1 | 12/2004 | Wideman et al. |
| 2005/0087336 A1 | 4/2005 | Surjaatmadja et al. |
| 2005/0189029 A1 | 9/2005 | Quigley et al. |
| 2007/0125439 A1 | 6/2007 | Quigley et al. |
| 2007/0154269 A1 | 7/2007 | Quigley et al. |
| 2007/0246459 A1 | 10/2007 | Loveless et al. |
| 2008/0006337 A1 | 1/2008 | Quigley et al. |
| 2008/0006338 A1* | 1/2008 | Wideman et al. ............ 138/126 |
| 2008/0014812 A1 | 1/2008 | Quigley et al. |
| 2008/0185042 A1 | 8/2008 | Feechan et al. |
| 2008/0210329 A1 | 9/2008 | Quigley et al. |
| 2009/0090460 A1 | 4/2009 | Wideman et al. |
| 2009/0107558 A1 | 4/2009 | Quigley et al. |
| 2009/0173406 A1 | 7/2009 | Quigley et al. |
| 2009/0278348 A1 | 11/2009 | Brotzell et al. |
| 2010/0101676 A1 | 4/2010 | Quigley et al. |

FOREIGN PATENT DOCUMENTS

| | | |
|---|---|---|
| DE | 1959738 | 8/1987 |
| DE | 3603597 | 8/1987 |
| DE | 4040400 | 8/1992 |
| DE | 4214383 | 9/1993 |
| DE | 199505448 A1 | 8/2000 |
| EP | 0024512 | 3/1981 |
| EP | 0024512 A1 | 3/1981 |
| EP | 0024512 B1 | 3/1981 |
| EP | 0203887 | 12/1986 |
| EP | 0352148 | 1/1990 |
| EP | 0427306 | 5/1991 |
| EP | 0477704 | 4/1992 |
| EP | 0503737 | 9/1992 |
| EP | 505815 A2 | 9/1992 |
| EP | 505815 B2 | 9/1992 |
| EP | 0536844 | 4/1993 |
| EP | 0681085 | 11/1995 |
| EP | 0854029 A2 | 7/1998 |
| EP | 0854029 A3 | 7/1998 |
| EP | 0953724 | 11/1999 |
| EP | 0970980 | 1/2000 |
| EP | 0981992 | 3/2000 |
| FR | 989204 | 9/1951 |
| GB | 553110 | 5/1943 |
| GB | 809097 | 2/1959 |
| GB | 909187 | 10/1962 |
| GB | 956500 | 4/1964 |
| GB | 1297250 | 11/1972 |
| GB | 2103744 | 2/1983 |
| GB | 2159901 | 12/1985 |
| GB | 2 193 006 | 1/1988 |
| GB | 2255994 | 11/1992 |
| GB | 2270099 | 3/1994 |
| GB | 2365096 | 2/2002 |
| JP | 163 592 | 6/1990 |
| WO | WO-8704768 | 8/1987 |
| WO | WO-9113925 | 9/1991 |
| WO | WO-9221908 | 12/1992 |
| WO | WO-9307073 | 4/1993 |
| WO | WO-9319927 | 10/1993 |
| WO | WO-9502782 | 1/1995 |
| WO | WO-9712115 | 4/1997 |
| WO | WO-9712166 | 4/1997 |
| WO | WO-9919653 | 4/1999 |
| WO | WO-0031458 | 6/2000 |
| WO | WO-0073695 | 12/2000 |
| WO | WO-2006003208 | 1/2006 |

OTHER PUBLICATIONS

Connell et al. "Coiled Tubing: Application for Today's Challenges" Petroleum Engineer International, pp. 18-21 (Jul. 1999).

Dalmolen "The Properties, Qualification, and System Design of, and Field Experiences with Reinforced Thermoplastic Pipe for Oil and Gas Applications" NACE International, 2003 West Conference (Feb. 2003).

Feechan et al. "Spoolable Composites Show Promise" The American Oil & Gas Reporter, pp. 44-50 (Sep. 1999).

Fiberspar Tech Notes, "Horizontal well deliquification just got easier-with Fiberspar Spoolable Production Systems," TN21-R1UN1-HybridLift, 2010, 2 pages.

Fowler "Advanced Composite Tubing Usable" The American Oil & Gas Reporter, pp. 76-81 (Sep. 1997).

Fowler et al. "Development Update and Applicaitons of an Advanced Composite Spoolable Tubing" Offshore Technology Conference held in Houston, Texas from May 4-7, 1988, pp. 157-162.

Hahn et al. "Compression Failure Mechanism s in Unidirecitonal Composites" NASA Technical Memorandum pp. 1-42 (Aug. 1984).

Hansen et al. "Qualification and Verificaiton of Spoolable High Pressure Composite Services Lines for the Asgard Field Development Project" paper presented at the 1997 Offshore Technology Conference held in Houston, Texas from May 5-8, 1997, pp. 45-54.

Hartman et al. "High Strength Glass Fibers" Owens Corning Technical Paper (Jul. 1996).

Haug et al. "Dynamic Umbilical with Composite Tube (DUCT)" Paper presented at the 1998 Offshore Tehnology Conference held in Houston, Texas from May 4-7, 1998; pp. 699-712.

International Search Report for PCT/US2000/26977 mailed on Jan. 22, 2001, (3 pages).

International Search Report for PCT/US2000/41073 mailed on Mar. 5, 2001, (3 pages).

International Search Report for PCT/US2004/16093 mailed on Nov. 8, 2005, (9 pages).

International Search Report and Written Opinion for PCT/US2010/060582 mailed on Feb. 16, 2011, (11 pages).

Lundberg et al.; "Spin-off Technologies from Development of Continuous Composite Tubing Manufacturing Process", Paper presented at the 1998 Offshore Technology Conference held in Houston, Texas from May 4-7, 1998 pp. 149-155.

Marker et al.; "Anaconda: Joint Development Project Leads to Digitally Controlled Composite Coiled Tubing Drilling System", Paper presented at the SPEI/COTA, Coiled Tubing Roundtable held in Houston, Texas from Apr. 5-6, 2000, pp. 1-9.

Measures et al.; "Fiber Optic Sensors for Smart Structures," Optics and Lasers Engineering 16: 127-152 (1992).

Measures R. M.; "Smart Structures with Nerves of Glass". Prog. Aerospace Sci. 26(4): 289-351 (1989).

Mesch, K.A., "Heat Stabilizers," Kirk-Othmer Encyclopedia of Chemical Technology, 2000 pp. 1-20.

Moe Wood T. et al.; "Spoolable, Composite Piping for Chemical and Water Injection and Hydraulic Valve Operation", Proceedings of the 11th International Conference on Offshore Mechanics and Arctic Engineering-I 992-, vol. III, Part A—Materials Engineering, pp. 199-207 (1992).

Proper Peter; "Braiding", International Encyclopedia of Composites, Published by VGH, Publishers, Inc., 220 East 23rd Street, Suite 909, New York, NY I0010.

Quigley et al. "Development and Application of a Novel Coiled Tubing String for Concentric Workover Services "Paper presented at the 1997 Offshore Technology Conference held in Houston, Texas from May 5-8, 1997, pp. 189-202.

Rispler et al. "Composite Coiled Tubing in Harsh Completion/Workover Environments" Paper presented at the SPE GAS Technology Symposium and Exhibition held in Calgary, Alberta, Canada on Mar. 15-18, 1998, pp. 405-410.

Sas-Jaworsky et al. "Advanced composites enhance coiled tubing capabilities" World Oil, pp. 57-69 (Apr. 1994).

(56) References Cited

OTHER PUBLICATIONS

Sas-Jaworsky et al. "Coiled Tubing 1995 Update: Prodcution Applications " World Oil, 216(6): 97 (Jun. 1995).

Sas-Jaworsky et al. "Development of a composite coiled tubing for oilfield services" Society of Petroleum Engineers, SPE 26536, pp. 1-11 (1993).

Sas-Jaworsky et al. "Developments Position CT for Future Prominense" The Amreican Oil & Gas Reporter, pp. 87-92 (Mar. 1996).

Sas-Jaworsky et al. "Enabling capabilities and potential applications of composite coiled tubing "Proceedings of World Oil's 2nd International Conference on Coiled Tubing Technology, pp. 2-9 (1994).

Sas-Jaworsky et al. "Innovative Applications Stimulate Coiled Tubing Devleopment" World Oil, 217(6): 61 (Jun. 1996).

Shuart et al. "Compression Behavior of $^\mp 45°$ Dominated Laminates with a Circular Hole or Impact Damage" AIAA Journal 24(1): pp. 115-122 (Jan. 1986).

Silverman "Spoolable Composite Pipe for Offshore Applications" Materials Selection & Design, pp. 48-50 (Jan. 1997).

Sperling, L.H., "Introduction to Physical Polymer Science 3rd Edition," Wiley-Interscience, New York, NY, 2001, p. 100.

Tore Wood Moe et al. "Spoolable, Composite Piping for Chemical and Water Injection and Hydraulic Valve Operation" Proceedings of the 11th International Conference on Offshore Mechanics and Arctic Engineering 1992, vol. III, Part A—Materials Engineering, pp. 199-207 (1992).

Williams et al. "Composite Spoolable Pipe Development, Advancements, and Limitations" Paper presneted at the 2000 Offshore Technology Conference held in Houston, Texas from May 1-4, 2000, pp. 1-16.

Williams, J.G., "Oil Industry Experiences with Fiberglass Components," Offfshore Technology Conference, Houston, Texas, Apr. 27-30, 1987, pp. 211-220.

\* cited by examiner

FIBER REINFORCED SPOOLABLE PIPE

RELATED APPLICATION INFORMATION

This application is a continuation of U.S. patent application Ser. No. 12/404,513, filed Mar. 16, 2009, which is a continuation of U.S. patent application Ser. No. 11/010,827, filed Dec. 13, 2004, which claims priority to U.S. provisional Patent Application 60/548,638 filed Feb. 27, 2004, all of which are hereby incorporated by reference in their entirety.

BACKGROUND (1) Field

The present disclosure relates generally to spoolable tubing, and more particularly to spoolable tubing or pipes capable of operating in a pressure range that may be considered below the pressure ranges generally suited to fiber reinforced composite or metallic spoolable pipe, but above the pressure ranges generally suited to unreinforced polymeric pipes.

(2) Description of Relevant Art

Spoolable tubing, or tubing capable of being spooled upon a reel, is commonly used in numerous oil well operations, although other applications exist. For example, oil well operations include running wire line cable down hole with well tools, working over wells by delivering various chemicals down hole, and performing operations on the interior surface of the drill hole. The tubes are spoolable so that a tube can be used with one well, and then transported on a reel to another well at a different location. Steel coiled tubing is typically capable of being spooled because the steel used in the product exhibits high ductility (i.e., the ability to plastically deform). Unfortunately, the repeated spooling and use of steel coiled tubing causes fatigue damage that can cause the steel coiled tubing to fracture and fail, often without notice. The hazards of operating steel coiled tubing, i.e., risk to personnel and high economic cost resulting from down-time needed to retrieve the broken tubing sections, forces steel coiled tubing to be retired after a relatively few number of trips into a well.

Steel coiled tubing has also proven to be subject to expansion after repeated uses. Tube expansion results in reduced wall thickness with the associated reduction in the pressure carrying capability of the steel coiled tubing. Steel coiled tubing known in the art is typically limited to an internal pressure up to about 5,000 psi. Accordingly, higher pressure and continuous flexing typically reduces the steel tube's integrity and service life.

For example, the present accepted industry standard for steel coiled tube is an A-606 type 4 modified HSLA steel with yield strengths ranging from 70 ksi to 80 ksi. The HSLA steel tubing typically undergoes bending, during the deployment and retrieval of the tubing, over radii significantly less than the minimum bending radii needed for the material to remain in an elastic state. The repeated bending of steel coiled tubing into and out of plastic deformation induces irreparable damage to the steel tube body leading to low-cycle fatigue failure.

Additionally, when steel coiled tubing is exposed to high internal pressures and bending loads, the isotropic steel is subjected to high triaxial stresses imposed by the added pressure and bending loads. The high triaxial stresses result in significant plastic deformation of the tube and diametral growth of the tube body, commonly referred to as "ballooning". When the steel coiled tube experiences ballooning, the average wall thickness of the tube is reduced, and often causes a bursting of the steel tube in the area of decreased thickness.

Steel coiled tubes also experience thinning of the tube walls due to the corrosive effect of materials used in the process of working over the well and due to materials located on the inner surface of the well bore. The thinning resulting from corrosive effects of various materials causes a decrease in the pressure and the tensile load rating of the steel coiled tubing.

Spoolable tubing can also be installed in permanent applications such as in transport of oil and gas and produced materials from wells, or injection of materials into wellbores. Typically in these applications the spoolable pipe is buried, but it can also be installed on surface. Spoolable pipe can also be installed vertically in wellbores in permanent applications including production tubing, casing, or other conduits from surface.

When the ends of a tube are subjected to opposing forces, the tube is said to be under tension. The tensile stress at any particular cross-section of the tube is defined as the ratio of the force exerted on that section by opposing forces to the cross-sectional area of the tube. The stress is called a tensile stress, meaning that each portion pulls on the other.

With further reference to a tube subjected to opposing forces, the term strain refers to the relative change in dimensions or shape of the tube that is subjected to stress. For instance, when a tube is subjected to opposing forces, a tube whose natural length is L0 will elongate to a length L1=L0+ΔL, where ΔL is the change in the length of the tube caused by opposing forces. The tensile strain of the tube is then defined as the ratio of ΔL to L0, i.e., the ratio of the increase in length to the natural length.

The stress required to produce a given strain depends on the nature of the material under stress. The ratio of stress to strain, or the stress per unit strain, is called an elastic modulus. The larger the elastic modulus, the greater the stress needed for a given strain.

For an elastomeric type material, such as used in tubes, the elongation at break may be high (typically greater than 400 percent) and the stress-strain response may be highly nonlinear. Therefore, it is common practice to define a modulus of elasticity corresponding to a specified elongation. The modulus for an elastomeric material corresponding to 200 percent elongation typically ranges form 300 psi to 2000 psi. In comparison, the modulus of elasticity for typical plastic matrix material used in a composite tube is from 100,000 psi to 500,000 psi or greater, with representative strains to failure of from 2 percent to 10 percent. This large difference in modulus of elasticity and strain to failure between rubber and plastics and thus between tubes and composite tubes may permit a tube to be easily collapsed to an essentially flat condition under relatively low external pressure. This large difference may also eliminate the spoolable pipe's capability to carry high axial tension or compression loads while the higher modulus characteristic of the plastic matrix material used in a composite tube is sufficiently stiff to transfer loads into the fibers and thus resist high external pressure and axial tension and compression without collapse.

The procedure to construct a composite tube to resist high external pressure and compressive loads involves using complex composite mechanics engineering principles to ensure that the tube has sufficient strength. Such a composite tube is presented in U.S. Pat. Nos. 5,921,285, 6,016,845, 6,148,866, 6,286,558, 6,357,485, and 6,604,550 the entireties of which are incorporated herein by reference in their entireties. There are some applications in which the high external pressures for which such composite pipes are desirable, may not be present, and thus, other types of reinforced spoolable pipe may be preferable.

SUMMARY

Disclosed is a spoolable pipe having a wall that includes an internal pressure barrier or liner formed about a longitudinal axis, and at least one reinforcing layer enclosing the internal pressure barrier, where the reinforcing layer(s) includes fibers having at least a partial helical orientation relative to the longitudinal axis.

Also disclosed is a spoolable tube that comprises an internal pressure barrier formed about a longitudinal axis; at least one reinforcing layer enclosing the internal pressure barrier, where the at least one reinforcing layer comprises at least two plies of fibers having at least a partial helical orientation relative to the longitudinal axis and whereat least one abrasion resistant layer is disposed between the at least two plies of fibers, the spoolable pipe also including an external layer enclosing the at least one reinforcing layer. The spoolable pipe of this disclosure can also include a reinforcing layer that includes at least two plies, at least four plies, or even at least eight plies of fibers that have about an equal but opposite helical orientation relative to the longitudinal axis. In certain embodiments, at least one abrasion layer is disposed between at least two plies, or for example, between each of the plies. In other embodiments, the plies may be counterwound unidirectional plies. In other embodiments, the fibers or plies may be axially oriented. The reinforcing layers may further include a coating, in some embodiments.

The internal pressure barriers of the disclosed spoolable tubes may carry at least twenty-five percent of the axial load along the longitudinal axis at a termination, or at least fifty percent of an axial load. Reinforcing layers of a spoolable tube may include glass, for example, e-glass, e-cr glass, Advantex®, and/or aramid, carbon, minerals, for example, basalt fibers, ceramic, metal or polymer.

This disclosure also provides for a spoolable pipe comprising an internal pressure barrier formed about a longitudinal axis, at least one reinforcing layer enclosing the internal pressure barrier, the at least one reinforcing layer including fibers having at least a partial helical orientation relative to the longitudinal axis, and, at least one external layer enclosing the at least one reinforcing layer and having a permeability at least five times greater, or at least ten times greater than the permeability of the internal pressure barrier.

The spoolable pipes disclosed herein may include a perforated or discontinuous external layer. The external layer may include a plurality of perforations. In other embodiments, the spoolable pipes disclosed herein may include one or more energy conductors.

Also disclosed herein is a spoolable pipe, comprising an internal pressure barrier formed about a longitudinal axis, at least one reinforcing layer enclosing the internal pressure barrier, the at least one reinforcing layer including fibers having at least a partial helical orientation relative to the longitudinal axis, the at least one reinforcing layer including a coating; and at least one external layer enclosing the at least one reinforcing layer. Such coatings can include silane compounds, sizing treatment, abrasion resistant compositions and water resistant compositions.

The spoolable pipes disclosed may also include a means for venting gasses or liquids. A spoolable pipe may include a fitting or coupling, for example, that interfaces with the internal barrier and/or the external layer.

Other objects and advantages will become apparent hereinafter in view of the specification and drawings.

DETAILED DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems or methods of the present disclosure.

Disclosed is a spoolable tube that provides a path for conducting fluids (i.e., liquids and gases) along the length of the spoolable tube. For example, the spoolable tube can transmit fluids down a well hole for operations upon the interior surfaces of the well hole, the spoolable tube can transmit fluids or gases to hydraulic or pneumatic machines operably coupled to the spoolable tube, and/or the spoolable tube can be used to transmit fluids on surface from well holes to transmission or distribution pipelines. Accordingly, the spoolable tube can provide a conduit for powering and controlling hydraulic and/or pneumatic machines, and/or act as a conduit for fluids, for example gases or liquids.

Figure 1:
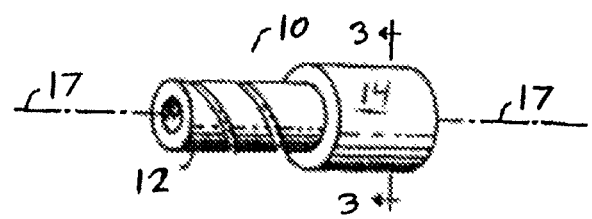
FIG. 1 is a side view, partially broken away, of a spoolable tube that includes an inner pressure barrier and a reinforcing layer.

FIG. 1 illustrates a spoolable tube 10 constructed of an internal pressure barrier 12 and a reinforcing layer 14. The spoolable tube can be generally formed along a longitudinal axis 17. Although illustrated in FIG. 1 as having a circular cross-section, the disclosed spoolable tube can have a variety of tubular cross-sectional shapes, including but not limited to circular, oval, rectangular, square, polygonal, and/or others.

The internal pressure barrier 12, otherwise referred to as a liner, can serve as a pressure containment member to resist leakage of internal fluids from within the spoolable tube 10. In some embodiments, the internal pressure barrier 12 can include a polymer, a thermoset plastic, a thermoplastic, an elastomer, a rubber, a co-polymer, and/or a composite. The composite can include a filled polymer and a nano-composite, a polymer/metallic composite, and/or a metal (e.g., steel, copper, and/or stainless steel). Accordingly, an internal pressure barrier 12 can include one or more of a high density polyethylene (HDPE), a cross-linked polyethylene (PEX), a polyvinylidene fluoride (PVDF), a polyamide, polyethylene terphthalate, polyphenylene sulfide and/or a polypropylene. In one embodiment, the internal pressure barrier 12 includes a modulus of elasticity greater than about approximately 50,000 psi, and/or a strength greater than about approximately 1,000 psi. In some embodiments, the internal pressure barrier 12 can carry at least fifteen percent of the axial load along the longitudinal axis, at least twenty-five percent of the axial load along the longitudinal axis, or at least thirty percent of the axial load along the longitudinal axis at a termination, while in some embodiments, the internal pressure barrier 12 can carry at least fifty percent of the axial load along the longitudinal axis at a termination. Axial load may be determined at the ends of a tube. For example, at the ends, or a termination, of a tube, there may be a tensile (e.g. axial) load equal to the internal pressure multiplied by the area of the pipe.

Referring back to FIG. 1, the spoolable tube 10 can also include one or more reinforcing layers 14. In one embodiment, the reinforcing layers can include fibers having at least a partially helical orientation relative to the longitudinal axis of the spoolable tube. The fibers may have a helical orientation between substantially about thirty degrees and substantially about seventy degrees relative to the longitudinal axis 17. For example, the fibers may be counterwound with a helical orientation of about ±40°, ±45°, ±50°, ±55°, and/or ±60°. The reinforcing layer may include fibers having multiple, different orientations about the longitudinal axis. Accordingly, the fibers may increase the load carrying strength of the reinforcing layer(s) 14 and thus the overall load carrying strength of the spoolable tube 10. In another embodiment, the reinforcing layer may carry substantially no axial load carrying strength along the longitudinal axis at a termination.

Exemplary fibers include but are not limited to graphite, KEVLAR, fiberglass, boron, polyester fibers, polymer fibers, mineral based fibers such as basalt fibers, and aramid. For example, fibers can include glass fibers that comprise e-cr glass, Advantex®, s-glass, d-glass, or a corrosion resistant glass.

The reinforcing layer(s) 14 can be formed of a number of plies of fibers, each ply including fibers. In one embodiment, the reinforcing layer(s) 14 can include two plies, which can optionally be counterwound unidirectional plies. The reinforcing layer(s) can include two plies, which can optionally be wound in about equal but opposite helical directions. The reinforcing layer(s) 14 can include four, eight, or more plies of fibers, each ply independently wound in a helical orientation relative to the longitudinal axis. Plies may have a different helical orientation with respect to another ply, or may have the same helical orientation. The reinforcing layer(s) 14 may include plies and/or fibers that have a partially and/or a substantially axial orientation. The reinforcing layer may include plies of fibers with an abrasion resistant material disposed between each ply, or optionally disposed between only certain plies. In some embodiments, an abrasion resistant layer is disposed between plies that have a different helical orientation.

The fibers can include structural fibers and flexible yarn components. The structural fibers can be formed of carbon, aramid, thermoplastic, and/or glass. The flexible yarn components, or braiding fibers, can be formed of either polyamide, polyester, aramid, thermoplastic, glass and/or ceramic. The fibers included in the reinforcing layer(s) 14 can be woven, braided, knitted, stitched, circumferentially (axially) wound, helically wound, and/or other textile form to provide an orientation as provided herein (e.g., in the exemplary embodiment, with an orientation between substantially about thirty degrees and substantially about seventy degrees relative to the longitudinal axis 17). The fibers can be biaxially or triaxially braided.

In one embodiment, the reinforcing layer(s) 14 includes fibers having a modulus of elasticity of greater than about 5,000,000 psi, and/or a strength greater than about 100,000 psi. In some embodiments, an adhesive can be used to bond the reinforcing layer(s) 14 to internal pressure barrier 12. In other embodiments, one or more reinforcing layers are substantially not bonded to one or more of other layers, such as the inner liner, internal pressure barriers, or external layer(s).

Figure 2:
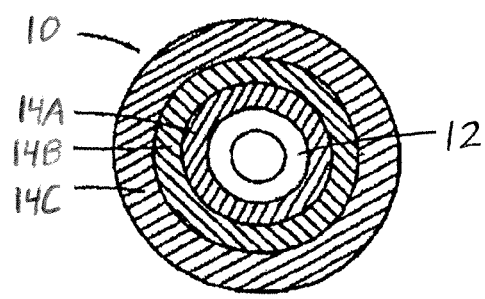
FIG. 2 is a cross-sectional view of a spoolable tube having an inner pressure barrier surrounded by multiple reinforcing layers.

FIG. 2 illustrates a cross-section of a circular spoolable tube 10 having an inner pressure barrier liner 12 and a first reinforcing layer 14A, a second reinforcing layer 14B, and a third reinforcing layer 14C. Each of the reinforcing layers 14A-C may be formed of fibers, and each of the reinforcing layers 14A-C successively encompasses and surrounds the underlying reinforcing layer and/or pressure barrier 12.

The fibers in each of the reinforcing layers 14A-C can be selected from the same or different material. For example, the first reinforcing layer 14A can comprise helically oriented glass fibers; second reinforcing layer 14B can comprise a ply having helically oriented glass fiber at the same angle, but at an opposite orientation of the first reinforcing layer 14A; and third reinforcing layer 14C can comprise plies of fibers having a clockwise and counter-clockwise helically oriented glass fibers. Further, the different reinforcing layers 14A-C can include different angles of helical orientation. For example, in one embodiment, the different layers can have angles of orientation between substantially about thirty degrees and substantially about seventy degrees, relative to the axis 17. Alternatively, the different layers can have angles of orientation between substantially about forty-six degrees and substantially about fifty-two degrees, relative to the axis 17. In some embodiments, the different layers 14A-C can have more than one fiber within a layer, such as carbon and glass, and/or carbon and aramid, and/or glass and aramid. Further, the different layers 14A-C may each comprise multiple plies, each independent ply having a different, or substantially the same, helical orientation with respect to other plies within a layer.

Figure 3:
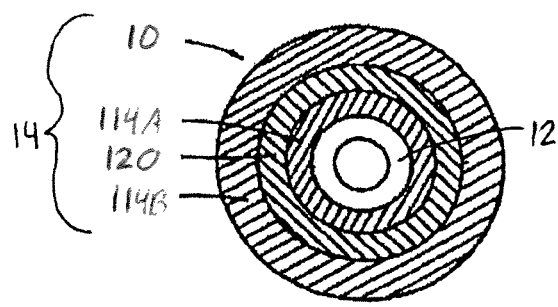
FIG. 3 is cross-sectional view of a spoolable tube having an inner pressure barrier surrounded by a reinforcing layer that includes two plies of fibers with an abrasion layer between the two plies.

FIG. 3 illustrates a cross-section of a circular spoolable tube 10 having an inner pressure barrier liner 12 and a first reinforcing layer 14. Reinforcing layer 14 comprises a first ply of fibers 114A, an abrasion resistant layer 120, and a second ply of fibers 114B. Each of the plies 114A, B may be formed of fibers, and each of ply 114A, abrasion resistant layer 120, and ply 114B successively encompasses and surrounds any other underlying reinforcing layer, abrasion resistant layer, ply(s) and/or pressure barrier 12.

The fibers in each of plies 114A, B can be selected from the same or different material. For example, the ply 114A can comprise at least partially helically oriented glass fibers; second ply 114B can comprise a ply having at least partially helically oriented glass fiber at the same angle, but at an opposite orientation of the first ply 114A. Further, the plies 114A, B can include different angles of helical orientation. For example, in one embodiment, the different plies can have angles of orientation between substantially about thirty degrees and substantially about seventy degrees, relative to the axis 17. Alternatively, the different plies can have angles of orientation between substantially about forty-six degrees and substantially about fifty-two degrees, relative to the axis 17. For example, one ply 114A may comprise fibers with helical orientation of about ±40°, ±45°, ±50°, ±55°, and/or ±60°, and a second ply 114B may comprise fibers with about an equal but opposite orientation. One or more plies, or one or more fibers within a ply may be substantially axially oriented. Further, the plies 114A, B can include about the same angle of helical orientation. In some embodiments, the different plies 114A, B can have more than one fiber within a ply, such as carbon and glass, and/or carbon and aramid, and/or glass and aramid.

In some embodiments, the abrasion resistant layer 120 may include a polymer. Such abrasion resistant layers can include a tape or coating or other abrasion resistant material, such as a polymer. Polymers may include polyethylene such as, for example, high-density polyethylene and cross-linked polyethylene, polyvinylidene fluoride, polyamide, polypropylene, terphthalates such as polyethylene therphthalate, and polyphenylene sulfide. For example, the abrasion resistant layer may include a polymeric tape that includes one or more polymers such as a polyester, a polyethylene, cross-linked polyethylene, polypropylene, polyethylene terphthalate, high-density polypropylene, polyamide, polyvinylidene fluoride, polyamide, and a elastomer. An exemplary tube as in FIG. 3 may include at least one reinforcing layer that includes a first ply of fiber, for example glass, an abrasion resistant layer, for example a polymeric tape spirally wound around the first ply of fiber, and a second ply of fiber with a substantially different, or substantially similar, helical orientation to that of the first ply. In an alternative embodiment, the reinforcing layer 14 may include four, eight, or more plies of fibers, with an abrasion resistant layer optionally between each ply.

Figure 4:
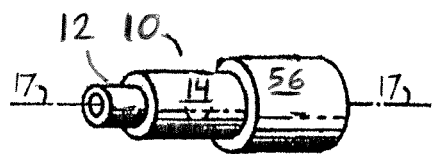
FIG. 4 is a side view, partially broken away, of a spoolable tube having an inner pressure barrier, a reinforcing layer, and an external layer; and, FIG. 5 is a side view, partially broken away, of a spoolable tube that includes an energy conductor.

FIG. 4 illustrates a spoolable tube 10 elongated along an axis 17 and having an internal pressure barrier 12, a reinforcing layer 14, and at least one external layer 56 enclosing the reinforcing layer(s) 14. The external layer(s) 56 may otherwise be understood to be an outer protective layer. The external layer 56 can bond to a reinforcing layer(s) 14, and in some embodiments, also bond to an internal pressure barrier 12. In other embodiments, the external layer 56 is substantially unbonded to one or more of the reinforcing layer(s) 14, or substantially unbonded to one or more plies of the reinforcing layer(s) 14. The external layer 56 may be partially bonded to one or more other layers of the tube.

The external layer(s) 56 can provide wear resistance and impact resistance. For example, the external layer 56 can provide abrasion resistance and wear resistance by forming an outer surface to the spoolable tube that has a low coefficient of friction thereby reducing the wear on the reinforcing layers from external abrasion. Further, the external layer 56 can provide a seamless layer, to, for example, hold the inner layers 12, 14 of the coiled spoolable tube 10 together. The external layer 56 can be formed of a filled or unfilled polymeric layer. Alternatively, the external layer 56 can be formed of a fiber, such as aramid or glass, with or without a matrix. Accordingly, the external layer 56 can be a polymer, thermoset plastic, a thermoplastic, an elastomer, a rubber, a co-polymer, and/or a composite, where the composite includes a filled polymer and a nano-composite, a polymer/metallic composite, and/or a metal. In some embodiments, the external layer(s) 56 can include one or more of high density polyethylene (HDPE), a cross-linked polyethylene (PEX), a polyvinylidene fluoride (PVDF), a polyamide, polyethylene terphthalate, polyphenylene sulfide and/or a polypropylene. The external layer 56 can include a modulus of elasticity greater than about approximately 50,000 psi, and/or a strength greater than about approximately 1,000 psi. In an embodiment, the external layer 56 can carry at least ten percent, twenty percent, twenty-five percent, thirty percent or even at least fifty percent of an axial load in the longitudinal direction at a termination. A seamless external layer can comprise, for example, a perforated thermoplastic.

In some embodiments, the external layer 56 can be formed by extruding, while the layer 56 can be formed using one or more materials applied at least partially helically and/or at least partially axially along the longitudinal axis 17. The material can include, for example, one or more polymeric tapes. In an example embodiment, the external layer 56 can include and/or otherwise have a coefficient of friction less than a coefficient of friction of a reinforcing layer 14.

Particles can be added to the external layer 56 to increase the wear resistance of the external layer 56. The particles used can include one or more of ceramics, metallics, polymerics, silicas, or fluorinated polymers. For example, adding TEFLON (MP 1300) particles and an aramid powder (PD-T polymer) to the external layer 56 can reduce friction and enhance wear resistance.

It can be understood that pressure from fluids transported by the spoolable tubes 10 disclosed herein may not be properly released from the reinforcing layer(s) 14, and/or from the inner pressure barrier liner and/or from within the external layer, without, for example, an external layer having a permeability to provide such pressure release. Such accumulation of pressure can cause deterioration of the spoolable pipe 10, for example, external layer rupture or inner pressure barrier collapse. Accordingly, in some embodiments, to allow for pressure release along the length of the spoolable pipe 10, the external layer(s) 56 can include and/or have a permeability at least five, or at least ten times greater than the permeability of the internal pressure barrier 12. For example, external layer(s) 56 include perforations or holes spaced along the length of tube. Such perforations can, for example, be spaced apart about every 10 ft, about every 20 ft, about every 30 ft, and even about or greater than about every 40 ft. In one embodiment, the external layer 56 can be perforated to achieve a desired permeability, while additionally and optionally, an external layer 56 can include one or more polymeric tapes, and/or may be discontinuous.

The disclosed spoolable tubes 10 can also include one or more couplings or fittings. For example, such couplings may engage with, be attached to, or in contact with one or more of the internal and external layers of a tube, and may act as a mechanical load transfer device. Couplings may engage one or both of the inner liner, the external wear layer or the reinforcing layer. Couplings or fittings may be comprised, for example, of metal or a polymer, or both. In some embodiments, such couplings may allow tubes to be coupled with other metal components. In addition, or alternatively, such couplings or fittings may provide a pressure seal or venting mechanism within or external to the tube. One or more couplings may each independently be in fluid communication with the inner layer and/or in fluid communication with one or more reinforcing layers and/or plies of fibers or abrasion resistant layers, and/or in fluid communication with an external layer. Such couplings may provide venting, to the atmosphere, of any gasses or fluids that may be present in any of the layers between the external layer and the inner layer, inclusive.

Figure 5:
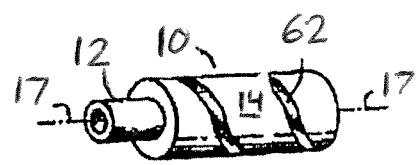

With reference to FIG. 5, the disclosed spoolable tubes 10 can also include one or more energy conductors 62 that can be integral with the wall of the spoolable pipe. Accordingly, the energy conductors 62 can be integral with the internal pressure barrier, reinforcing layer(s), and/or exist between such internal pressure barrier 12 and reinforcing layer 14, and/or exist between the internal pressure barrier 12 and an external layer. In some embodiments, the energy conductor 62 can extend along the length of the spoolable tube 10. The energy conductors 62 can include an electrical guiding medium (e.g., electrical wiring), an optical and/or light guiding medium (e.g., fiber optic cable), a hydraulic power medium (e.g., a high pressure tube or a hydraulic hose), a data conductor, and/or a pneumatic medium (e.g., high pressure tubing or hose).

The disclosed energy conductors 62 can be oriented in at least a partially helical direction relative to a longitudinal 17 axis of the spoolable tube 10, and/or in an axial direction relative to the longitudinal axis 17 of the spoolable tube 10.

FIG. 5 illustrates a spoolable tube 10 elongated along an axis 17 wherein the spoolable tube includes an internal pressure barrier 12, a reinforcing layer 14, and an energy conductor 62. In the FIG. 5 embodiment, the energy conductor 62 forms part of the reinforcing layer 14; however, as provided previously herein, it can be understood that the energy conductor(s) 62 can be integrated with and/or located between internal pressure barrier 12 and the reinforcing layer 14.

A hydraulic control line embodiment of the energy conductor 62 can be either formed of a metal, composite, and/or a polymeric material.

In one embodiment, several energy conductors 62 can power a machine operably coupled to the coiled spoolable tube 10. For instance, a spoolable tube 10 can include three electrical energy conductors that provide a primary line 62, a secondary line 62, and a tertiary line 62 for electrically powering a machine using a three-phase power system. As provided previously herein, the spoolable tube 10 can also include internal pressure barriers 12 for transmitting fluids along the length of the tube 10.

What has thus been described is for example, a spoolable pipe having a wall that includes an internal pressure barrier formed about a longitudinal axis, and a reinforcing layer(s) enclosing the internal pressure barrier. In one embodiment, the reinforcing layer(s) can include fibers having at least a partial helical orientation relative to the longitudinal axis. In another embodiment, the partial helical orientation can be between about approximately thirty and about approximately seventy degrees relative to the longitudinal axis, and the wall can include at least one external layer enclosing the reinforcing layer(s) and having a permeability at least ten times greater than the permeability of the internal pressure barrier. The reinforcing layer(s) and/or fibers in the reinforcing layers can include a coating. The pipe can also include an energy conductor(s) integrated with and/or located between the internal pressure barrier and/or the reinforcing layer(s).

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun can be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, can be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A spoolable pipe, comprising:
    an internal pressure barrier formed about a longitudinal axis;
    at least one reinforcing layer enclosing the internal pressure barrier, the at least one reinforcing layer comprising at least two plies of fibers having at least a partial helical orientation relative to the longitudinal axis, wherein at least one abrasion resistant layer is disposed between the at least two plies of fibers; and
    an external layer enclosing the at least one reinforcing layer.

2. The spoolable pipe according to claim 1, where the internal pressure barrier includes at least one of: a thermoset plastic, a thermoplastic, an elastomer, a rubber, a co-polymer, and a composite, where the composite includes at least one of: a filled polymer and a nano-composite, a polymer/metallic composite, and a metal.

3. The spoolable pipe according to claim 2, where the internal pressure barrier layer comprises at least one of: high density polyethylene (HDPE), cross-linked polyethylene, polyvinylidene fluoride (PVDF), polyamide, polypropylene, polyethylene terphthalate, and polyphenylene sulfide (PES).

4. The spoolable pipe according to claim 1, where the internal pressure barrier includes a modulus of elasticity greater than about 50,000 psi.

5. The spoolable pipe according to claim 1, where the at least one reinforcing layer comprises at least one of: an aramid, a carbon, a ceramic, a metal, a mineral, and a polymer.

6. The spoolable pipe according to claim 1, further including at least one energy conductor.

7. The spoolable pipe according to claim 6, wherein the at least one energy conductor being integrated with and located between the internal pressure barrier and the external layer.

8. The spoolable pipe according to claim 1, where the at least one energy conductor includes at least one of: a light guiding medium, an electric power medium, a data conducting medium, and a hydraulic power medium.

9. The spoolable pipe according to claim 1, further comprising at least one fitting or coupling.

10. The spoolable pipe of claim 9, wherein said fitting or coupling interfaces with said internal pressure barrier and said external layer.

11. The spoolable pipe of claim 9, wherein said fitting or coupling provides for venting of gasses or materials.

12. The spoolable pipe according to claim 1, where the spoolable pipe is spooled to a strain of greater than one percent without loss of burst or tensile strength.

13. A spoolable pipe, comprising:
    an internal pressure barrier formed about a longitudinal axis,
    at least one reinforcing layer enclosing the internal pressure barrier, the at least one reinforcing layer including fibers having at least a partial helical orientation relative to the longitudinal axis, and,
    at least one external layer enclosing the at least one reinforcing layer and having a permeability at least five times greater than the permeability of the internal pressure barrier, where the at least one external layer includes at least one of: high density polyethylene (HDPE), cross-linked polyethylene, polyvinylidene fluoride (PVDF), polyamide, polypropylene, polyethylene terphthalate, and polyphenylene sulfide (PES).

14. A spoolable pipe, comprising:

an internal pressure barrier formed about a longitudinal axis, at least one reinforcing layer enclosing the internal pressure barrier, the at least one reinforcing layer including fibers having at least a partial helical orientation relative to the longitudinal axis, and, at least one external layer enclosing the at least one reinforcing layer and having a permeability at least five times greater than the permeability of the internal pressure barrier, where the spoolable pipe is spooled to a strain of greater than one percent without loss of burst and tensile strength.

15. A spoolable pipe, comprising:

an internal pressure barrier formed about a longitudinal axis, at least one reinforcing layer enclosing the internal pressure barrier, the at least one reinforcing layer including fibers having at least a partial helical orientation relative to the longitudinal axis, and, at least one external layer enclosing the at least one reinforcing layer and having a permeability at least five times greater than the permeability of the internal pressure barrier, where the at least one external layer includes at least one energy conductor being at least one of integrated with and located between at least one of the internal pressure barrier and the at least one reinforcing layer.

* * * * *